UNITED STATES PATENT OFFICE.

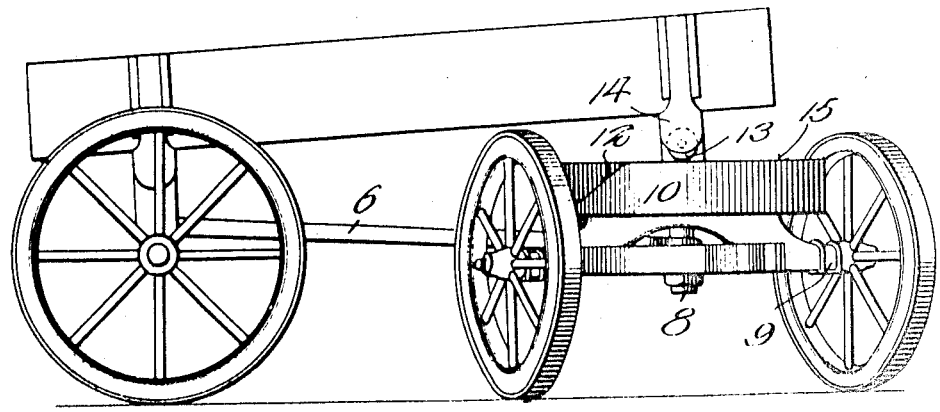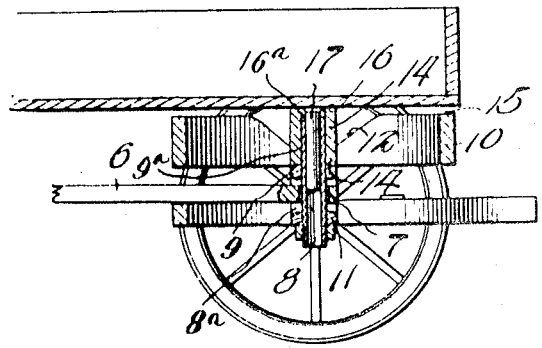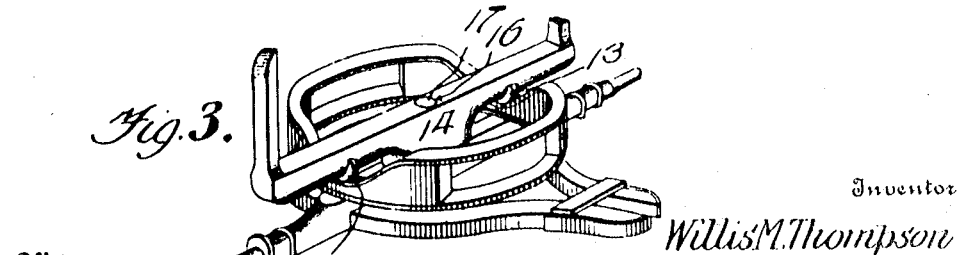

WILLIS M. THOMPSON, OF LANCASTER, NEBRASKA.

WAGON.

1,088,189.   Specification of Letters Patent.   Patented Feb. 24, 1914.

Application filed November 9, 1910.  Serial No. 591,486.

*To all whom it may concern:*

Be it known that I, WILLIS M. THOMPSON, a citizen of the United States, residing at Lancaster, in the county of Lancaster and State of Nebraska, have invented new and useful Improvements in Wagons, of which the following is a specification.

This invention relates to improvements in the construction of wagons having means for elevating the front bolster, when the wagon is turned in either direction, to permit the corresponding front wheel to move beneath the wagon body.

The object of the invention is to provide a specific form of connection between the front axle and bolster, which is adapted to maintain the same in constant parallel relation during vertical displacement of the latter, and which will prove strong and durable under the most trying conditions of usage.

The invention consists in the features of construction, combination and arrangement of parts, hereinafter fully described and claimed, reference being had to the accompanying drawing, in which:

Figure 1 is a side elevation of a wagon constructed in accordance with the invention, showing the front axle turned in one direction; Fig. 2 is a central, longitudinal sectional view taken through the forward portion of the wagon; and, Fig. 3 is a detail view of the front bolster.

In the accompanying drawing, the numeral 6 designates the reach bar of the wagon whose forward end is mounted within a horizontal slot 8ª provided centrally in the front axle 9, and is provided with a vertical opening 7 rotatably receiving the vertically disposed hollow post 8, which latter extends upwardly through the axle 9 to a considerable distance above the same. The front body bolster 14 is provided centrally with a vertical bore 9ª opening through its under face for the reception of the upper end portion of the hollow post 8. The upper end of the bore 9ª is reduced as at 16 for the reception of a king pin 17 which depends into the hollow post, the annular shoulder 16ª provided at the junction between the main portion and the reduced portion of the bolster bore being disposed at the level of the elevated active faces 15 of the fifth wheel 10, when the roller wheels 13 of the body elevating device are disposed within the depressions 12 of the fifth wheel.

From the above description taken in connection with the accompanying drawings, it will be noted, that when the front axle is rotated and the body bolster is consequently elevated by the means provided for the purpose, the said bolster and the king pin will be guided in their upward movement by the hollow post 8, so that a strong connection will be maintained between the front axle and the bolster at all times.

From the foregoing description, the simplicity and advantages of the structure just described will be apparent to those skilled in the art to which the invention appertains, it being noted that my improvement may be applied readily to vehicles now in use without materially changing the construction of the same.

Having thus described my invention, what I claim is:

1. The combination with the front axle and bolster of a wagon of the class described, of a vertically extending hollow post mounted in the said axle and projecting upwardly therefrom, the said bolster being provided with a vertical bore opening through its under face for the rotatable and slidable reception of said hollow post, and a king pin provided in said bolster bore concentric therewith for reception within the hollow post.

2. The combination with the front axle and bolster of a wagon of the class described, the said axle being provided with a horizontal slot for the reception of the reach bar of the wagon, of a vertically extending hollow post mounted within the said axle and extending through the slot for engagement with the reach bar, the said post projecting upwardly from the axle, the bolster being provided with a vertical bore opening through its end face for the rotatable and slidable reception of the said post and being provided with a smaller opening communicating with the upper end of the said bore, and a king pin adapted to depend through the last-named opening into the bore of the bolster concentric therewith for reception within the hollow post.

In testimony whereof I affix my signature in presence of two witnesses.

WILLIS M. THOMPSON.

Witnesses:
A. G. CASEY,
JAS. A. WELTON.

Copies of this patent may be obtained for five cents each, by addressing the "Commissioner of Patents, Washington, D. C."